(12) United States Patent
Valente et al.

(10) Patent No.: US 8,550,953 B2
(45) Date of Patent: Oct. 8, 2013

(54) MULTIPLE PUMP CONFIGURATION FOR LIMITED SLIP DIFFERENTIAL AND TORQUE TRANSFER DEVICE

(75) Inventors: Paul J. Valente, Berkley, MI (US); John C. Hibbler, Lake Orion, MI (US); Charles G. Stuart, Rochester Hills, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 222 days.

(21) Appl. No.: 13/193,773

(22) Filed: Jul. 29, 2011

(65) Prior Publication Data

US 2013/0029797 A1 Jan. 31, 2013

(51) Int. Cl.
*F16H 48/20* (2012.01)
*F16H 48/06* (2006.01)
*B60K 17/35* (2006.01)

(52) U.S. Cl.
USPC ............................. 475/231; 475/222; 180/249

(58) Field of Classification Search
USPC ............................. 475/86, 222, 231; 180/249
See application file for complete search history.

(56) References Cited

U.S. PATENT DOCUMENTS

| | | | |
|---|---|---|---|
| 4,212,591 A | 7/1980 | Lamontagne et al. | |
| 4,679,463 A | 7/1987 | Ozaki et al. | |
| 4,730,514 A | 3/1988 | Shikata et al. | |
| 5,058,700 A * | 10/1991 | Shibahata ..................... | 180/245 |
| 5,224,906 A | 7/1993 | Sturm | |
| 5,456,641 A * | 10/1995 | Sawase ........................... | 475/86 |
| 5,699,888 A | 12/1997 | Showalter | |
| 5,934,432 A | 8/1999 | Bates | |
| 5,964,126 A | 10/1999 | Okcuoglu | |
| 5,979,631 A | 11/1999 | Lundstrom | |
| 6,578,654 B2 | 6/2003 | Porter | |
| 6,578,692 B2 | 6/2003 | Porter | |
| 6,942,055 B2 | 9/2005 | Forsyth et al. | |
| 6,953,411 B2 * | 10/2005 | Burns et al. ................... | 475/231 |
| 6,997,299 B2 | 2/2006 | Brissenden et al. | |
| 7,004,873 B2 | 2/2006 | Puiu | |
| 7,021,445 B2 | 4/2006 | Brissenden et al. | |
| 7,182,194 B2 | 2/2007 | Ronk et al. | |
| 7,204,170 B2 | 4/2007 | Davidsson | |
| 7,210,376 B2 | 5/2007 | Davidsson | |
| 7,210,566 B2 | 5/2007 | Baxter, Jr | |
| 7,294,086 B2 | 11/2007 | Brissenden et al. | |
| 7,395,736 B2 | 7/2008 | Davidsson et al. | |
| 2003/0196844 A1 | 10/2003 | Porter | |
| 2005/0121283 A1 | 6/2005 | Brissenden et al. | |
| 2005/0145460 A1 | 7/2005 | Forsyth et al. | |
| 2008/0046158 A1 | 2/2008 | Carey et al. | |
| 2008/0296078 A1 | 12/2008 | Capito | |

* cited by examiner

*Primary Examiner* — Roger Pang
(74) *Attorney, Agent, or Firm* — Harness, Dickey & Pierce, P.L.C.

(57) ABSTRACT

A hydraulic system for a vehicle drivetrain includes a torque transfer device having a first actuator that actuates to selectively communicate rotatable motion from an input member to an output member. A limited slip differential selectively transfers drive torque from the output member to at least one of the first and second axle shafts. A motor drives a first and a second output shaft. A first pump is rotatably driven by the first output shaft. The first pump selectively supplies the hydraulic fluid to the first actuator. A second pump is rotatably driven by the second output shaft. The second pump selectively supplies the hydraulic fluid to the second actuator.

18 Claims, 3 Drawing Sheets

MULTIPLE PUMP CONFIGURATION FOR LIMITED SLIP DIFFERENTIAL AND TORQUE TRANSFER DEVICE

FIELD

The present disclosure relates generally to power transmission devices having a torque transfer device and a limited slip differential. More particularly, the present disclosure is directed to a hydraulic system having a single motor that drives a first and a second pump, where the first pump supplies hydraulic fluid to a first actuator of a torque transfer device and the second pump supplies hydraulic fluid to a second actuator in a limited slip differential.

BACKGROUND

This section provides background information related to the present disclosure which is not necessarily prior art.

Due to increased demand for four-wheel drive and all-wheel drive vehicles, many power transmission systems are being incorporated into vehicle driveline applications for transferring drive torque to the wheels. Many vehicles include a power transmission device operably installed between the primary and secondary drivelines. Such power transmission devices are typically equipped with a torque transfer device for selectively transferring drive torque from the primary driveline to the secondary driveline to establish a four-wheel drive mode of operation. An actuator typically regulates force applied to a clutch to vary drive torque transferred from the primary driveline to the secondary driveline.

In many examples, a differential is incorporated on the secondary driveline that receives an input from the torque transfer mechanism. The differential selectively transmits the drive torque to a pair of axle shafts. Some differentials include an additional mechanism that limits or selectively prevents differentiation of the speed between the output shafts, commonly referred to as "limited-slip differentials". Typically, the mechanical device to provide the limited-slip or non-slip function is a friction clutch. The friction clutch may be either a passive device which limits the differential speed between the output shafts only after a certain differential speed has been met or an active device which controls the allowable slip between the wheels. The friction active clutch may be actuated by an actuator that receives hydraulic fluid. In such vehicle drivetrains that incorporate both a torque transfer device and a limited-slip differential, it can be challenging to control fluid delivery to the respective actuators of the torque transfer device and the limited-slip differential in a simple and cost effective manner.

SUMMARY

This section provides a general summary of the disclosure, and is not a comprehensive disclosure of its full scope or all of its features.

A hydraulic system for a vehicle drivetrain includes a torque transfer device having a first actuator that actuates to selectively communicate rotatable motion from an input member to an output member. A limited slip differential selectively transfers drive torque from the output member to at least one of the first and second axle shafts. A motor drives a first and a second output shaft. A first pump is rotatably driven by the first output shaft. The first pump selectively supplies the hydraulic fluid to the first actuator. A second pump is rotatably driven by the second output shaft. The second pump selectively supplies the hydraulic fluid to the second actuator.

According to additional features, the hydraulic system further comprises a first clutch that is disposed between the motor and the second pump. The first clutch actuates to selectively transfer torque from the motor to the second pump. The first clutch according to one example is an electronic clutch.

According to still other features, a second clutch is disposed between the motor and the first pump. The second clutch actuates to selectively transfer torque from the motor to the first pump. According to one configuration, the second clutch is an electronic clutch. In other features, the hydraulic system can further comprise a toroidal continuously variable transmission that is disposed between the motor and the second pump. The toroidal continuously variable transmission is driven by the second output shaft of the motor.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

The present invention will become more fully understood from the details description and the accompanying drawings wherein.

Corresponding reference numerals indicate corresponding parts throughout the several views of the drawings.

DETAILED DESCRIPTION

Example embodiments will now be described more fully with reference to the accompanying drawings.

The following description of the preferred embodiments is merely exemplary in nature and is in no way intended to limit the invention, its application, or uses.

The present disclosure is directed to a hydraulic system for a vehicle drivetrain that includes a torque transfer device and a limited slip differential. The torque transfer device may be adaptively controlled for modulating the torque transferred between a rotatable input member and a rotatable output member. The limited slip differential is configured on a rear axle assembly to limit speed differentiation between rear output shafts. The hydraulic system described herein is therefore directed to a power transmission device of a rear drive module. However, other applications, such as hydraulic systems incorporated for use with a front axle assembly are contemplated. Accordingly, while the present invention is hereinafter described in association with a specific structural embodiment for use as a rear drive module in a driveline application, it should be understood that the arrangement shown and described herein is merely intended to illustrate an exemplary embodiment of the present invention.

Figure 1:
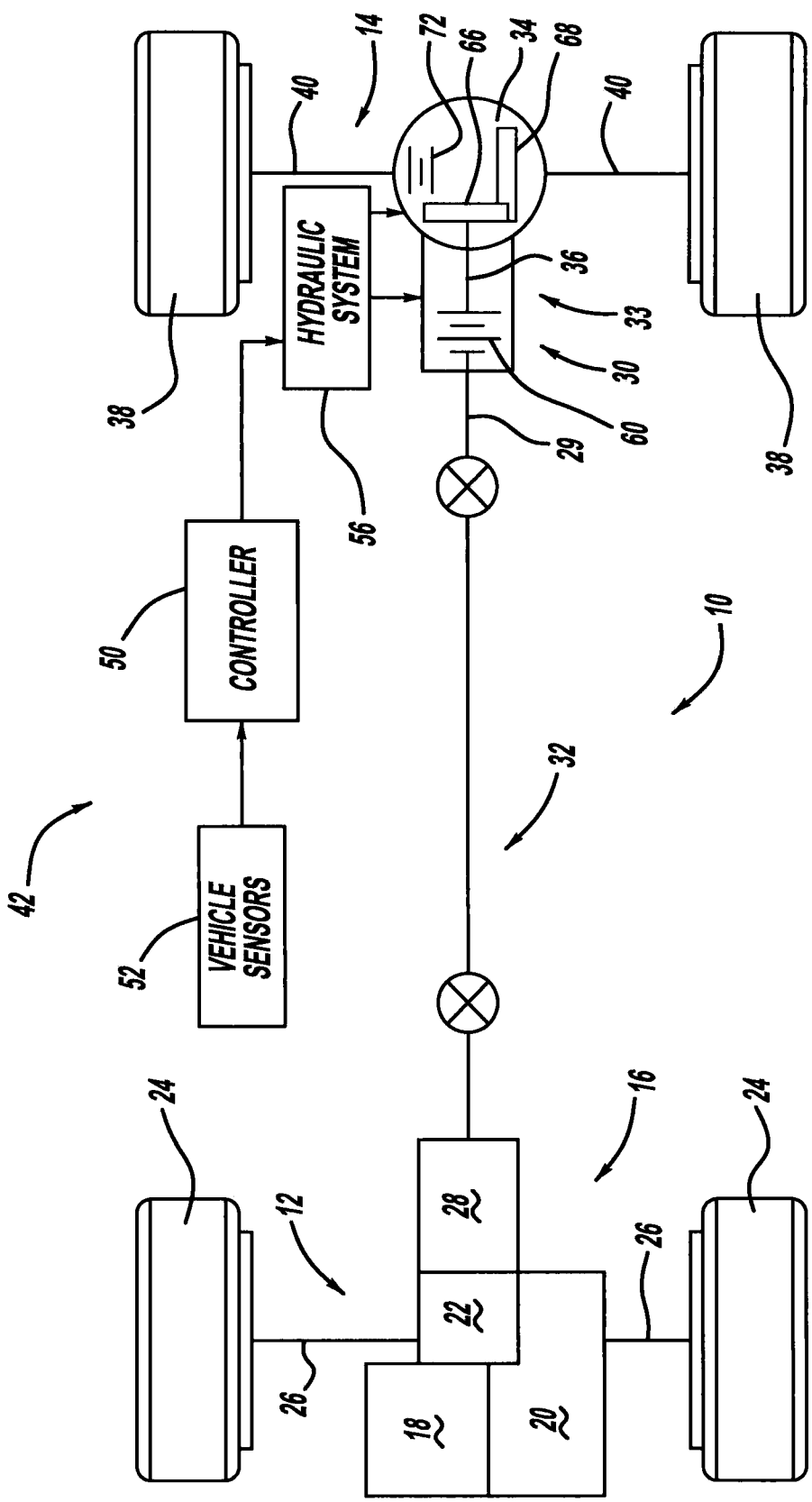
FIG. 1 is a schematic of a four-wheel drive vehicle equipped with a hydraulic system that communicates with a torque transfer device and a limited slip differential according to one example of the present teachings.

With initial reference to FIG. 1 of the drawings, a drivetrain 10 for a four-wheel vehicle is shown. The drivetrain 10 includes a first axle assembly 12, a second axle assembly 14, and a powertrain assembly 16 for generating and delivering drive torque to the axle assemblies 12 and 14, respectively. In the particular arrangement shown, the first axle assembly 12 is the front axle, while the second axle assembly 14 is the rear axle. The powertrain assembly 16 includes an engine 18 and a multi-speed transmission 20 having an integrated front differential unit 22 for driving front wheels 24 via front axle shafts 26. The powertrain assembly 16 further includes a transfer unit 28 driven by the transmission 20 for delivering torque to an input member 29 of a power transmission device 30 via a drive shaft assembly 32. The power transmission device 30 generally includes a torque transfer device 33 and a rear limited-slip differential 34. The input member 29 of the power transmission device 30 corresponds to an input member of the torque transfer device 33 and is coupled to the drive shaft assembly 32. An output member 36 of the torque transfer device 33 is arranged to drive the rear limited-slip differential 34. The second axle assembly 14 also includes a pair of wheels 38 that are connected to the rear differential 34 via rear axle shafts 40.

The drivetrain 10 is shown to include an electronically-controlled power transfer system 42 that includes the power transmission device 30. The power transfer system 42 is operable to selectively provide drive torque in a two-wheel drive mode or a four-wheel drive mode. In the two-wheel drive mode, torque is not transferred via the torque transfer device 33 of the power transmission device 30. Accordingly, one hundred percent of the drive torque delivered by the transmission 20 is provided to the front wheels 24. In the four-wheel drive mode, power is transferred through the torque transfer device 33 of the power transmission device 30 to supply drive torque to the rear wheels 38.

The power transfer system 42 further includes a controller 50 that is in communication with vehicle sensors 52 for detecting dynamic and operational characteristics of the motor vehicle. The vehicle sensors 52 can include, but are not limited to, sensors that can determine wheel speed, wheel slip, steering wheel angle, yaw rate, throttle position, engine/transmission torque, vehicle speed, stability control, etc.

In some examples, the information obtained by the controller 50 from the vehicle sensors 52 is used to determine the apply rates used by the hydraulic system 56 for the torque transfer device 33 and limited slip differential 34 as will become appreciated herein. In this regard, the controller 50 is operable to control actuation of the torque transfer device 33 and/or the limited slip differential 34 through a hydraulic system 56 in response to signals from the vehicle sensors 52. The controller 50 may be programmed with a predetermined target torque split between the first and second set of wheels 24 and 38, respectively. Alternatively, the controller 50 may function to determine the desired torque to be transferred through the torque transfer device 33 via other methods. Regardless of the method used for determining the magnitude of torque to transfer, the controller 50 operates the torque transfer device 33 to maintain the desired torque magnitude.

With continued reference to FIG. 1, the torque transfer device 33 of the power transmission device 30 will be described in greater detail. The torque transfer device 33 includes a friction clutch 60 that is operably disposed between the input member 29 and the output member 36. The friction clutch 60 can comprise a series of first and second clutch plates. Torque is transferred between the input member 29 and the output member 36 when the series of first and second clutch plates are forced into contact with each other as will be described herein. The output member 36 is preferably a pinion shaft that is supported by head and tail bearings (not specifically shown). The output member 36 has a pinion gear 66 that is meshed for rotation with a ring gear 68 on the limited slip differential 34.

The limited slip differential 34 according to the present teachings is an electronic limited slip differential that incorporates a hydraulic clutch pack 72. The hydraulic clutch pack 72 includes a series of first and second clutch plates. Torque is transferred between the rear axle shafts 40 depending upon the proportionally regulated clutch engagement force of the hydraulic clutch pack 72. As will be described herein, the hydraulic system 56 can be controlled by the controller 50 to increase or decrease the torque delivered between the rear wheels 38.

Figure 2:
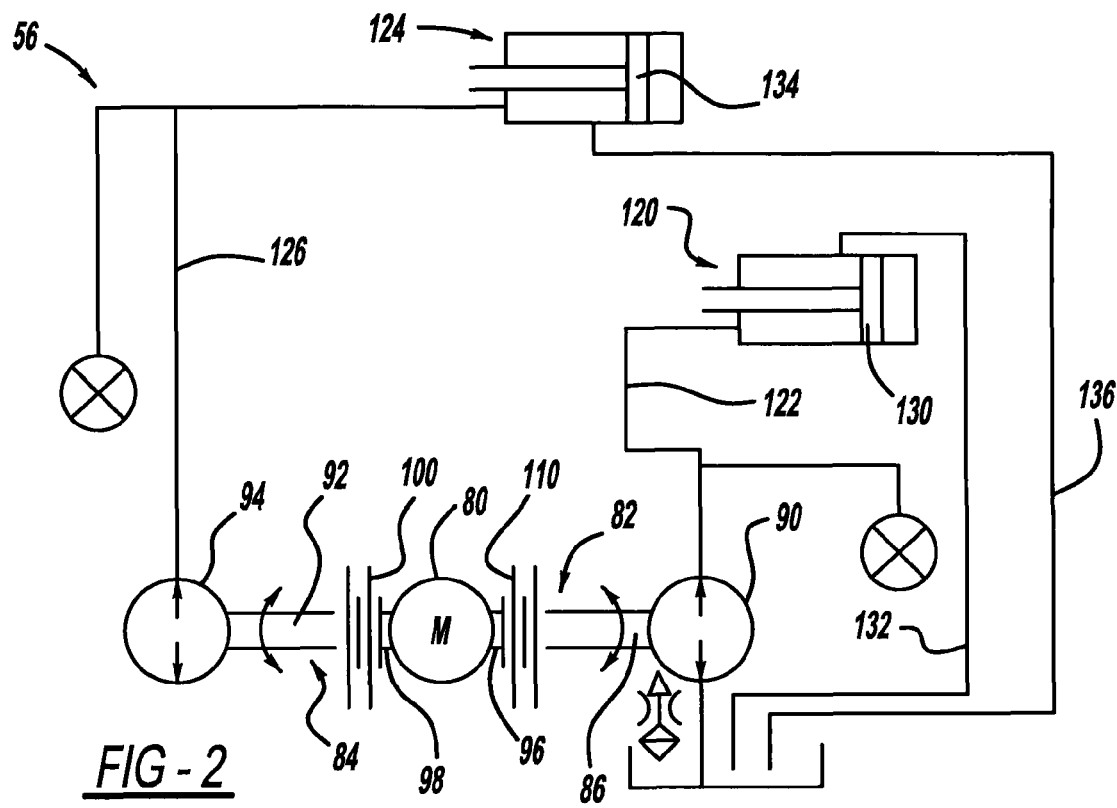
FIG. 2 is a schematic representation of a hydraulic system constructed in accordance to one example of the present teachings.

With continued reference to FIG. 1 and additional reference now to FIG. 2, the hydraulic system 56 will be described in greater detail. The hydraulic system 56 generally includes an electric motor 80 that drivingly rotates a first motor output shaft 82 and a second motor output shaft 84. The first motor output shaft 82 provides a rotatable input to a first pump input shaft 86 that drives a first pump 90. Similarly, the second motor output shaft 84 provides a rotatable input to a second pump input shaft 92 that drives a second pump 94. The first motor output shaft 82 further includes a first motor output shaft portion 96. The second motor output shaft 84 includes a second motor output shaft portion 98. A first clutch 100 can selectively transfer a rotatable input from the second motor output shaft portion 98 to the second pump input shaft 92. A second clutch 110 can selectively transfer a rotatable input from the first motor output shaft portion 96 to the first pump input shaft 86. The first and second clutches 100 and 110 can be electric clutches that both have a series of selectively engageable clutch plates.

The first pump 90 delivers hydraulic fluid to a torque transfer device actuator 120 via a fluid line 122. The first pump 90 therefore provides a controllable source of pressurized fluid to the fluid line 122. Regulation of the fluid pressure in the fluid line 122 acts to proportionally regulate a clutch engagement force of the friction clutch 60 (FIG. 1) applied by the torque transfer device actuator 120 which in turn, regulates the drive torque transferred from the input member 29 to the output member 36.

The second pump 94 delivers hydraulic fluid to a limited slip differential actuator 124 via a fluid line 126. The second pump 94 therefore provides a controllable source of pressurized fluid to the fluid line 126. Regulation of the fluid pressure in the fluid line 126 acts to proportionally regulate a clutch engagement force of the hydraulic clutch pack 72 (FIG. 1) applied by the limited slip differential actuator 124 which in turn, regulates the torque differentiation between the rear axle shafts 40.

The torque transfer device actuator 120 includes a piston 130 that actuates in response to the hydraulic fluid delivered through the fluid line 122 and delivers hydraulic fluid to the friction clutch 60. Fluid line 132 returns fluid to the reservoir. The limited slip differential actuator 124 includes a piston 134 that actuates in response to fluid communicated through the fluid line 126 and delivers fluid to the hydraulic clutch pack 72. Fluid line 136 returns fluid to the reservoir.

Figure 3:
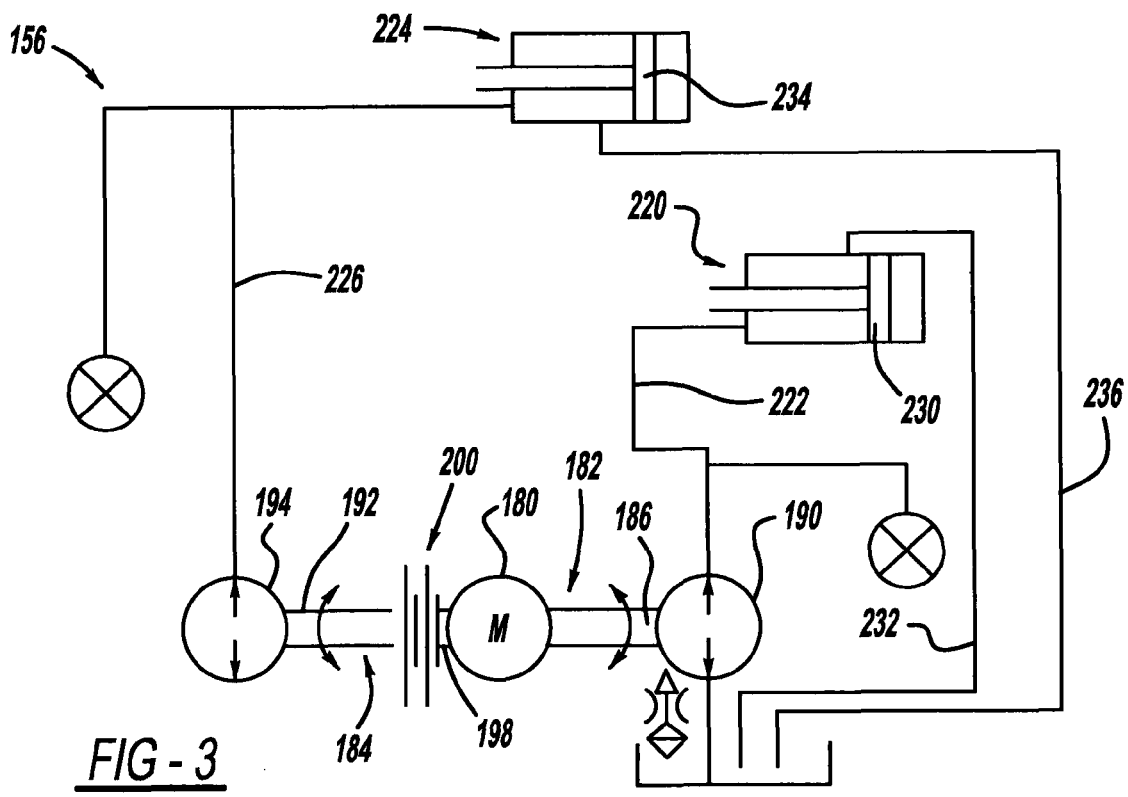
FIG. 3 is a schematic representation of a hydraulic system constructed according to other features of the present teachings.

With reference now to FIG. 3, a hydraulic system 156 constructed in accordance to additional features of the present teachings will be described. The hydraulic system 156 generally includes an electric motor 180 that drivingly rotates a first motor output shaft 182 and a second motor output shaft 184. The first motor output shaft 182 provides a rotatable input to a first pump input shaft 186 that drives a first pump 190. Similarly, the second motor output shaft 184 provides a rotatable input to a second pump input shaft 192 that drives a second pump 194. The second motor output shaft 184 includes a second motor output shaft portion 198. A first clutch 200 can selectively transfer a rotatable input from the second motor output shaft portion 198 to the second pump input shaft 192.

The first pump 190 delivers hydraulic fluid to a torque transfer device actuator 220 via a fluid line 222. The first pump 190 therefore provides a controllable source of pressurized fluid to the fluid line 222. Regulation of the fluid pressure in the fluid line 222 acts to proportionally regulate a clutch engagement force of the friction clutch 60 (FIG. 1) applied by the torque transfer device actuator 220 which in turn, regulates the drive torque transferred from the input member 29 to the output member 36.

The second pump 194 delivers hydraulic fluid to a limited slip differential actuator 224 via a fluid line 226. The second pump 194 therefore provides a controllable source of pressurized fluid to the fluid line 226. Regulation of the fluid pressure in the fluid line 226 acts to proportionally regulate a clutch engagement force of the hydraulic clutch pack 72 (FIG. 1) applied by the limited slip differential actuator 124 which in turn, regulates the torque differentiation between the rear axle shafts 40.

The torque transfer device actuator 220 includes a piston 230 that actuates in response to the hydraulic fluid delivered through the fluid line 222 and delivers hydraulic fluid to the friction clutch 60. The limited slip differential actuator 224 includes a piston 234 that actuates in response to fluid communicated through the fluid line 226 and delivers fluid to the hydraulic clutch pack 72.

Figure 4:
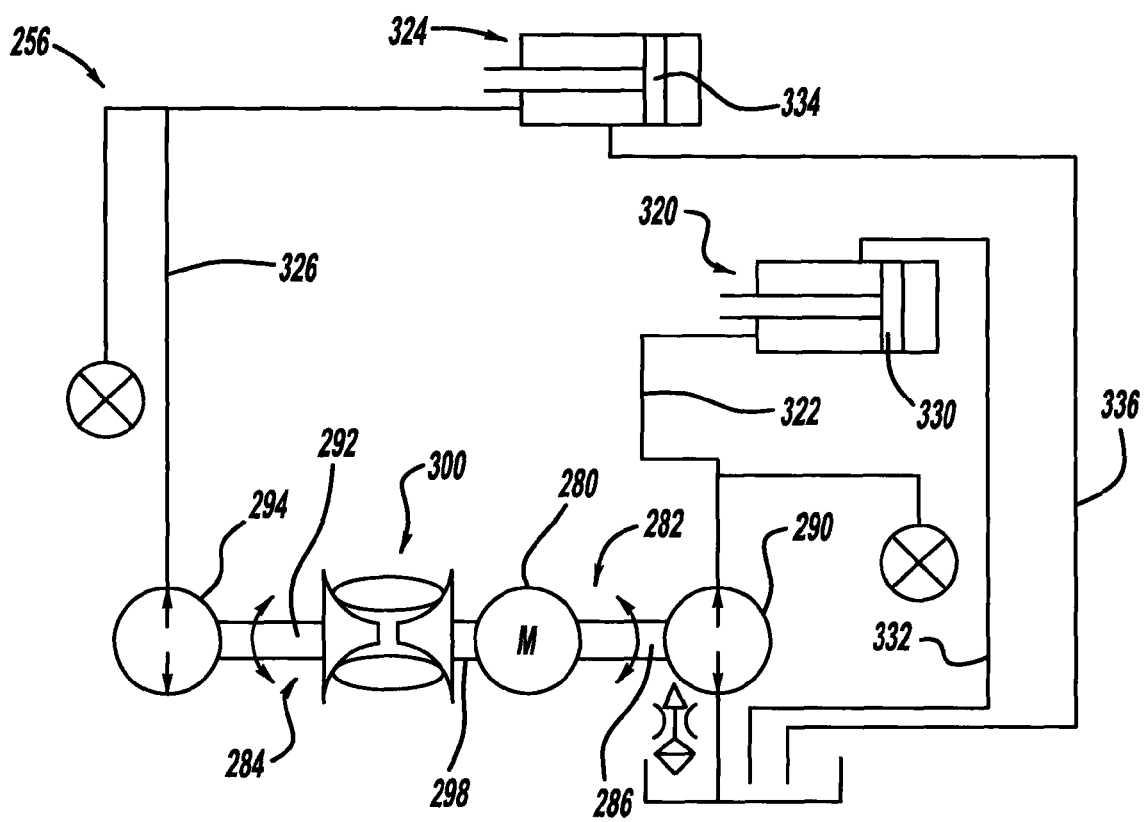
FIG. 4 is a schematic representation of a hydraulic system constructed according to yet another configuration of the present teachings.

With reference now to FIG. 4, a hydraulic system 256 constructed in accordance to additional features of the present teachings will be described. The hydraulic system 256 generally includes an electric motor 280 that drivingly rotates a first motor output shaft 282 and a second motor output shaft 284. The first motor output shaft 282 provides a rotatable input to a first pump input shaft 286 that drives a first pump 290. Similarly, the second motor output shaft 284 provides a rotatable input to a second pump input shaft 292 that drives a second pump 294. The second motor output shaft 284 includes a second motor output shaft portion 298. A continuously variable transmission (CVT) 300 can selectively transfer a rotatable input from the second motor output shaft portion 298 to the second pump input shaft 292. In one example, the CVT can be a torodial CVT.

The first pump 290 delivers hydraulic fluid to a torque transfer device actuator 320 via a fluid line 322. The first pump 290 therefore provides a controllable source of pressurized fluid to the fluid line 322. Regulation of the fluid pressure in the fluid line 322 acts to proportionally regulate a clutch engagement force of the friction clutch 60 (FIG. 1) applied by the torque transfer device actuator 320 which in turn, regulates the drive torque transferred from the input member 29 to the output member 36.

The second pump 294 delivers hydraulic fluid to a limited slip differential actuator 324 via a fluid line 326. The second pump 294 therefore provides a controllable source of pressurized fluid to the fluid line 326. Regulation of the fluid pressure in the fluid line 326 acts to proportionally regulate a clutch engagement force of the hydraulic clutch pack 72 (FIG. 1) applied by the limited slip differential actuator 124 which in turn, regulates the torque differentiation between the rear axle shafts 40.

The torque transfer device actuator 320 includes a piston 330 that actuates in response to the hydraulic fluid delivered through the fluid line 322 and delivers hydraulic fluid to the friction clutch 60. The limited slip differential actuator 324 includes a piston 334 that actuates in response to fluid communicated through the fluid line 326 and delivers fluid to the hydraulic clutch pack 72.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A hydraulic system for a vehicle drive train, the hydraulic system comprising:
   first and second driven shafts;
   a torque transfer device having a first actuator that actuates to selectively communicate rotatable motion from an input member to an output member;
   a differential that selectively transfers drive torque from the output member to at least one of the first and second driven shafts, the differential having a second actuator that actuates to vary the drive torque between the first driven shaft and the second driven shaft;
   a motor that drives a first output shaft and a second output shaft;
   a first pump that is rotatably driven by the first output shaft of the motor and that selectively supplies the hydraulic fluid to the first actuator; and
   a second pump that is rotatably driven by the second output shaft of the motor and that selectively supplies the hydraulic fluid to the second actuator.

2. The hydraulic system of claim 1, further comprising a first clutch disposed between the motor and the second pump.

3. The hydraulic system of claim 2 wherein the first clutch actuates to selectively transfer torque from the motor to the second pump.

4. The hydraulic system of claim 3 wherein the first clutch is an electronic clutch.

5. The hydraulic system of claim 2, further comprising a second clutch disposed between the motor and the first pump.

6. The hydraulic system of claim 5 wherein the second clutch actuates to selectively transfer torque from the motor to the first pump.

7. The hydraulic system of claim 6 wherein the second clutch is an electronic clutch.

8. The hydraulic system of claim 1, further comprising a toroidal continuously variable transmission disposed between the motor and the second pump.

9. The hydraulic system of claim 8 wherein the toroidal continuously variable transmission is driven by the second output shaft of the motor.

10. A hydraulic system for a vehicle drive train, the hydraulic system comprising:
    a torque transfer device having a first actuator that actuates to selectively communicate rotatable motion from an input member to an output member;

a differential that selectively transfers drive torque from the output member to at least one of a first driven shaft and a second driven shaft, the differential having a second actuator that actuates to vary the drive torque between a first driven shaft and a second driven shaft;

a motor that drives a first output shaft and a second output shaft;

a first pump that selectively supplies the hydraulic fluid to the first actuator;

a second pump that selectively supplies the hydraulic fluid to the second actuator; and a rotatable input source that drives both of the first and second pumps, the rotatable input source consisting of a single electric motor.

11. The hydraulic system of claim 10, further comprising a first clutch disposed between the motor and the second pump wherein the first clutch actuates to selectively transfer torque from the motor to the second pump.

12. The hydraulic system of claim 11 wherein the first clutch is an electronic clutch.

13. The hydraulic system of claim 11, further comprising a second clutch disposed between the motor and the first pump that actuates to selectively transfer torque from the motor to the first pump.

14. The hydraulic system of claim 13 wherein the second clutch is an electronic clutch.

15. The hydraulic system of claim 10, further comprising a toroidal continuously variable transmission disposed between the motor and the second pump.

16. A hydraulic system for a vehicle drive train, the hydraulic system comprising:

first and second driven shafts;

a torque transfer device having a first actuator that actuates to selectively communicate rotatable motion from an input member to an output member;

a differential that selectively transfers drive torque from the output member to at least one of the first and second driven shafts, the differential having a second actuator that actuates to vary the drive torque between the first driven shaft and the second driven shaft;

a motor that drives a first and a second output shaft;

a first pump that is rotatably driven by the first output shaft of the motor and that selectively supplies the hydraulic fluid to the first actuator;

a second pump that is rotatably driven by the second output shaft of the motor and that selectively supplies the hydraulic fluid to the second actuator;

a first clutch that is driven by the motor and that actuates to selectively transfer torque from the motor to the second pump; and a second clutch that is driven by the motor and that actuates to selectively transfer torque from the motor to the first pump.

17. The hydraulic system of claim 16 wherein the first clutch is an electronic clutch.

18. The hydraulic system of claim 16 wherein the first clutch is an electronic clutch.

\* \* \* \* \*